(12) United States Patent
Rusiniak

(10) Patent No.: US 8,276,884 B2
(45) Date of Patent: Oct. 2, 2012

(54) RECOVERY BUMPER WITH A MULTIPLE-PULLEY, MULTI-DIRECTIONAL WINCH-SYSTEM AND STABILIZING SUPPORT LEGS

(76) Inventor: Bernard Rusiniak, Depew, NY (US)

( * ) Notice: Subject to any disclaimer, the term of this patent is extended or adjusted under 35 U.S.C. 154(b) by 332 days.

(21) Appl. No.: 12/574,873

(22) Filed: Oct. 7, 2009

(65) Prior Publication Data

US 2010/0084878 A1    Apr. 8, 2010

Related U.S. Application Data

(60) Provisional application No. 61/103,377, filed on Oct. 7, 2008.

(51) Int. Cl.
*B66D 1/36* (2006.01)
(52) U.S. Cl. .......... 254/327; 254/323; 254/338
(58) Field of Classification Search .......... 254/323, 254/325, 328, 327, 338
See application file for complete search history.

(56) References Cited

U.S. PATENT DOCUMENTS

| | | | |
|---|---|---|---|
| 4,127,295 A | | 11/1978 | Robinson |
| 4,247,085 A | * | 1/1981 | Grimsrud ............... 254/426 |
| 4,635,875 A | * | 1/1987 | Apple ............... 242/155 BW |
| 4,861,218 A | * | 8/1989 | Lamer ............... 414/461 |
| 5,240,229 A | * | 8/1993 | Timmons ............... 254/338 |
| 6,056,274 A | * | 5/2000 | Naas et al. ............... 254/335 |
| 6,068,240 A | * | 5/2000 | Leveugle ............... 254/277 |
| 6,138,992 A | * | 10/2000 | Bell ............... 254/326 |
| 6,572,082 B1 | * | 6/2003 | Dixon et al. ............... 254/323 |
| 6,959,918 B1 | * | 11/2005 | Samuels ............... 254/338 |
| 7,093,823 B2 | * | 8/2006 | Sevalie' ............... 254/337 |
| 7,134,645 B1 | * | 11/2006 | Johnson et al. ............... 254/338 |
| 7,621,506 B2 | * | 11/2009 | Ebbenga ............... 254/278 |
| 7,849,965 B2 | * | 12/2010 | May ............... 182/142 |
| 7,866,632 B2 | * | 1/2011 | Ebbenga ............... 254/278 |

\* cited by examiner

*Primary Examiner* — Emmanuel M Marcelo
(74) *Attorney, Agent, or Firm* — Patricia M. Costanzo

(57) ABSTRACT

A remotely controllable recovery vehicle winch/stabilizing system, having a vehicle bumper; a first pulley attached to the bumper's first end; a winch attached to bumper's second end; a second pulley approximately midway between the first pulley and said winch and adjacent a swivel sheave; a cable, directed by the first and second pulleys and the swivel sheave, to be wound or unwound about the winch, with the pulleys, the swivel sheave, and the winch operatively arranged with respect to each other so as to maintain the cable perpendicular, or nearly so, to the rotational axis of the drum as it is fed to or played off of the drum so as to prevent the cable from jamming as the cable is used to either recover or deposit an object, and a set of stabilizing legs each leg attached to said bumper so as to stabilize and secure the recovery or release apparatus.

20 Claims, 2 Drawing Sheets

RECOVERY BUMPER WITH A MULTIPLE-PULLEY, MULTI-DIRECTIONAL WINCH-SYSTEM AND STABILIZING SUPPORT LEGS

CROSS-REFERENCE TO RELATED APPLICATIONS

This Application claims the benefit of Provisional Application No. 61/103,377 filed Oct. 7, 2008.

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISK APPENDIX

Not Applicable

BACKGROUND

The present invention relates generally recovery winch systems and, more particularly, to a remote-controllable recovery winch/stabilizer system that, during a recovery operation, provides for even feed of the winch cable onto the winch drum preventing jamming of the cable and means to stabilize the recovery vehicle.

The background information discussed below is presented to better illustrate the novelty and usefulness of the present invention. This background information is not admitted prior art.

Winches long have been used for moving large and heavy objects. Typically, when using a winch, one end of a long wire rope (a winch cable) is securely attached to the object, such as a vehicle, to be retrieved while the other end of the cable is attached to and wound about a winch drum. In this manner, a winch is used to lift and/or to move objects that would be too difficult to move or lift manually. In general, a winch typically includes a high torque motor for rotating the winch drum to wind the cable. This motor can be, for example, a hydraulic motor or an electric motor with high torque gear reduction. Once the cable is attached, for example, to the vehicle to be recovered, the motor is used to turn the winch drum to wind the attached cable about the drum. This creates a tension in the cable that is used to pull and/or lift the vehicle.

SUMMARY

During the recovery of an object, such as when a tow truck is recovering a vehicle to be recovered, the present inventor observed that more often than not the winch cable of the recovery vehicle becomes tangled and jams after the cable has been attached to the vehicle to be recovered and is being rewound onto the winch drum. After studying this situation, he discerned that a winch cable will wind evenly on the drum when the cable is maintained perpendicular, or nearly so, to the rotational axis of the winch drum as the cable is being rewound onto the drum. However, in most vehicle recovery cases, the position of the recovery vehicle relative to the vehicle to be recovered prevents feeding the winch cable to the winch drum so that the cable can be maintained perpendicular, or nearly so, to the rotational axis of the drum, which inevitably results in the cable migrating toward one side of the drum to wind only about that side, and thus, to tangle and consequently jam, and possibly become damaged. Whenever a cable becomes jammed it must be manually un-jammed and then manually guided onto the drum evenly. The process frequently needs to be repeated several times before the cable is completely wound on the drum. This is dangerous for the operator, time consuming, costly, and annoying, and may also significantly reduce the life of the cable. In addition, there is always the danger that the cable will be significantly weakened and break. If the cable breaks, the results could be disastrous, especially if the vehicle to be recovered is located on an incline. The situation becomes even more dangerous when the vehicle is perched precariously on a steep incline or on the edge of a cliff and there is no way to secure the recovery vehicle during the recovery operation. When a jam occurs in this type of situation, the winch cannot be released because the vehicle will roll or fall down the incline. In addition, the weight of the vehicle can make it very difficult and even impossible for the cable to be un-jammed. A related hazard occurs when the recovery operation destabilizes the recovery vehicle, in that the recovery operation can inadvertently cause the recovery vehicle to move. Such movement could be merely an inconvenience, but in certain situations, such movement could result in disaster and even death.

Accordingly, the inventor devised a set of principles that provides for an innovative winch structure that is especially helpful to recovery apparatus, such as tow trucks, and the means to maintain the recovery apparatus stable. Thus, the principles of the present invention provide for a winch cable to be always maintained perpendicular, or nearly so, to the rotational axis of the drum as it is fed to the drum and for means to stabilize the recovery apparatus in a level position. The principles of the present invention require that the winch, pulleys (including the swivel sheave pulley), and cable be positioned relative to one-another and to the vehicle being recovered to provide for the winch cable always to be maintained perpendicular, or nearly so, to the rotational axis of the drum as it is fed to or played off of the drum, that the winch can be remotely controlled from inside of the cab, and for a set of stabilizing legs to stabilize and secure the recovery or release apparatus.

From here-on-in a tow truck will be used to illustrate how the principles of the present invention may be implemented, with the understanding that a tow truck is only one example of a recovery, or conversely a release vehicle and, thus, that the invention principles may be used in other machines, and also that the relative positions of the winch and pulleys may be rearranged in any desired position as long as the winch cable always is maintained perpendicular, or nearly so, to the rotational axis of the drum as it is fed to or played off of the drum.

The inventor discovered that the winch cable can be maintained perpendicular, or nearly so, to the rotational axis of the drum as it is fed to or played off of the drum by: (1) positioning the winch relative to the long axis of the bumper of the recovery vehicle so that the winch cable is always maintained perpendicular, or nearly so, to the rotational axis of the drum, and (2) locating the winch relative to the pulleys and the vehicle to be recovered so that the length of cable between the winch itself and the swivel sheave the cable first encounters as it is being fed back onto the winch drum to be as long as possible. This length should aim to be about one and a half times as long as the axial length of the bumper. The increased cable length provides for increased control over the motion of the cable.

Presently there are two types of tow trucks available, those that have a winch mounted in the center of a tow truck bumper attached to one end or the other of a towing vehicle, and those having the winch mounted in the center of a bumper-like structure that is attached to one side or the other of the towing vehicle. In the first type there is minimal control of the movement of the winch cable. In this case, once the cable is attached to the object to be recovered and the operator starts to rewind the cable onto the winch drum, the cable is pulled though typical roller guides that are mounted on the bumper directly in front of the winch. If the object to be recovered is not situated directly in front of and is not centered on the long axis of a front-loading recovery vehicle, the cable will be positioned at an acute angle to the winch drum and, thus, will likely tangle. A similar situation exists for side-retrieving vehicles. Side-retrieving vehicles are limited in that they can retrieve from one side of the vehicle only. Thus, the retrieving vehicle must be able to be positioned so that its retrieving side can be facing the object to be retrieved, and, of course, this often is not possible.

Thus, a winch system, for use with a recovery vehicle, having a heavy duty bumper, and a cable/winch structure designed so as to maintain its winch cable perpendicular, or nearly so, to the rotational axis of its winch drum as it is fed to the drum to prevent cable tangling is herein taught. Moreover the system provides the recovery vehicle with means to maintain itself secure and stabilized while on a variety of surfaces. The winch system made according to the principles of the present invention embodies, for example, a heavy-duty bumper attachable to a recovery vehicle so as to be extending transversely to and rigidly secured in spaced relation to the front of the frame of the vehicle with the winch drum, pulleys, and swivel-sheave being housed in spaced cavities fitted into the upper surface of the bumper and so positioned with respect to each other and the vehicle to be recovered so that the winch cable is always positioned perpendicular, or nearly so, to the winch drum. This example provides for an extended length of cable to be worked by the pulley system before it is rewound (or played off of) the winch drum to provide more control over the cable so that in can always be maintained perpendicular, or nearly so, to the winch drum. The extended length is made possible by housing the winch in a cavity in the bumper that is positioned at one end, or the other, of the bumper and is positioned relative to the long axis of the bumper so that the winch cable is always positioned perpendicular, or nearly so, to the winch drum as it is rewound onto or played off of the drum. As the winch cable is rewound or played-out from the winch drum, it is guided by two vertical-axis pulleys and a rotable, horizontal-axis sheave pulley that are all positioned in individual cavities of which all are open to the top surface with the swivel sheave being open to both the top surface and the outer-facing surface of the bumper. If desired, the pulleys, including the swivel sheave, need not be housed in cavities in the bumper, but to do keeps them protected from the elements and mechanical damage. The swivel-able horizontal-axis sheave pulley provides for the cable to work in direction-changing relation of the cable reach to the front of the recovery vehicle, which in turn provides for the recovery vehicle to be positioned relative to the vehicle to be recovered to provide for the cable to be maintained perpendicular, or nearly, to the winch drum. The recovery vehicle is stabilized and leveled by retractable recovery legs are provided as part of the bumper/winch system. If desired, D-rings are provided to provide for attachment of additional line, if required.

Rubber padding is permanently attached to the outwardly facing surface of the recovery vehicle's bumper to enable the recovery vehicle to use the bumper to push a disabled vehicle out of harms way without damaging the tow truck's custom-built bumper. The rubber padding is provided with an access opening over the cavity housing the cable, hook, and swivel-sheave to enable access of the cable and hook when needed. An optional cover over the spaced cavities housing the pulleys and cable drum may be provided on the top surface of the bumper to protect the pulley system parts from the elements.

The principles of the present invention are expressed by providing for an apparatus, comprising:
a winch system, comprising
a first pulley attached to a first end of a support;
a winch attached to a second end of the support, and
a second pulley approximately midway between the first pulley and the winch and adjacent to a swivel sheave facing the outwardly facing side of said support,
a cable having a hook and being directed by the first and second pulleys and the swivel sheave to be wound or unwound about the winch, with the pulleys, the swivel sheave, and the winch operatively arranged with respect to each other so as to maintain the cable perpendicular, or nearly so, to the rotational axis of the drum as it is fed to or played off of the drum so as to prevent the cable from jamming as the hooked cable is used to either recover or deposit an object.

Where the winch is oriented with respect to the long axis of the support so that the cable is maintained positioned perpendicularly, or nearly so, to the axis of rotation of the winch.

Furthermore, where the cable attached to the winch is directed by the first pulley, then by the second pulley, and then by the swivel sheave and where the winch is located relative to the first and second pulley and the swivel sheave and a vehicle to be recovered so that the cable running between the winch and the swivel sheave is of a maximized length.

Where the support is a bumper and where the maximized length aims to be about one and a half times as long as the axial length of the bumper.

The first pulley, the second pulley, the swivel sheave, and the winch are to be housed in cavities set into the bumper, with the first pulley, the second pulley, the swivel sheave, and winch housed in cavities open on the upwardly-facing surface of the bumper.

Moreover where the set of pulleys, including the swivel sheave, and the winch comprise a winch system and the winch system may further include a power system for powering the winch.

The winch further comprises a winch drum and the winch is oriented with respect to the long axis of the bumper so that the cable is always positioned perpendicularly to the winch drum.

Additionally, the first and the second pulley are fitted with a cable guard so as to maintain the cable on the pulley.

Furthermore, the swivel sheave is housed in a cavity in the bumper open on the upwardly-facing surface and the outwardly-facing side surface of the bumper.

The winch system further comprises a set of stabilizing legs with each leg attached to the bumper so as to stabilize and secure the recovery or release apparatus.

The winch is positioned at a first end of the length of the bumper and the first pulley is located generally opposite to the winch at the second end of the bumper, and the swivel sheave is located approximately midway between the first and second ends of the bumper, with the second pulley being located just behind the swivel sheave.

The principles of the present invention may also be described as providing for an apparatus, comprising:
a recovery vehicle winch/stabilizing system, comprising
a bumper extending transversely to and rigidly secured in spaced relation to the front of a frame of a recovery vehicle;
a winch secured in a cavity in a first end of the length of the bumper;

a cable;

a cable directing first pulley secured in a cavity open on the upper surface of the bumper and in a second end of the length of the bumper, and a cable directing second pulley secured in a cavity open on the upper surface of the bumper and about midway of the length of the bumper toward the vehicle facing side of the bumper, the first and second pulleys each fitted with cable guards so as to maintain the cable as it travels about the pulleys, a cable directing swivel sheave secured in a cavity about midway of the length of the bumper toward the side of the bumper facing away from the vehicle adjacent to the second pulley, the cavity in which the swivel sheave is secured being open to both the top surface and the outer-facing surface of the bumper, a cable directed by the first pulley, second pulley, and swivel sheave so as to maintain the cable positioned perpendicular, or nearly so, to the winch drum, the winch positioned relative to the long axis of the bumper so as the cable is maintained positioned perpendicular, or nearly so, to the winch drum as it is rewound onto or played off of the drum, and a set of stabilizing legs each leg attached to the bumper so as to stabilize and secure the recovery or release apparatus.

Still other benefits and advantages of this invention will become apparent to those skilled in the art upon reading and understanding the following detailed specification and related drawings.

BRIEF DESCRIPTION OF THE DRAWINGS

In order that these and other objects, features, and advantages of the present invention may be more fully comprehended and appreciated, the invention will now be described, by way of example, with reference to specific embodiments thereof which are illustrated in appended drawings wherein like reference characters indicate like parts throughout the several figures. It should be understood that these drawings only depict preferred embodiments of the present invention and are not therefore to be considered limiting in scope, thus, the invention will be described and explained with additional specificity and detail through the use of the accompanying drawings, in which.

A LIST OF REFERENCE NUMERAL AND THE PARTS TO WHICH THEY REFER

Figure 1:
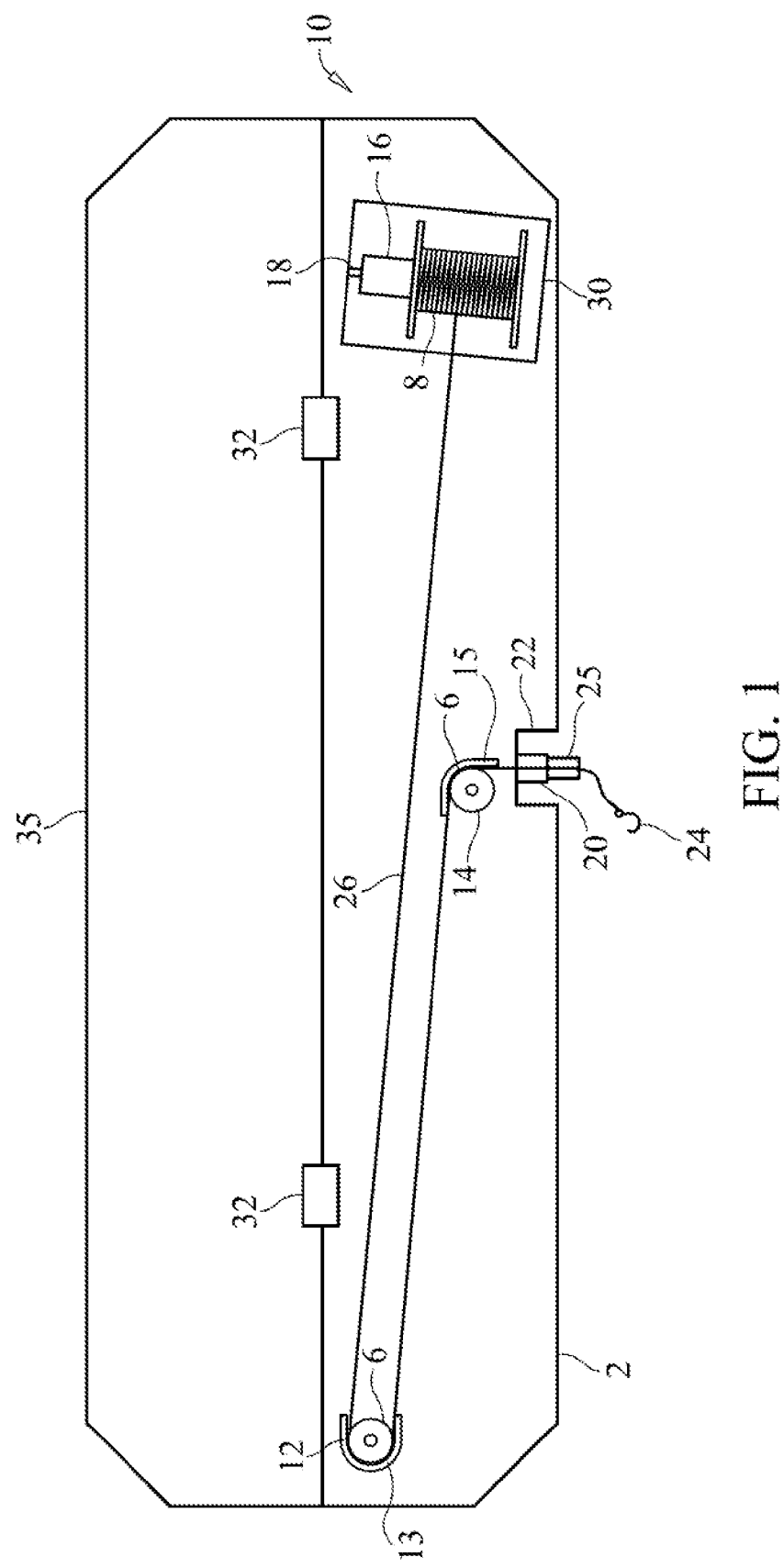
FIG. 1 is a plan view of a bumper housing a winch-cable system according to the principles of the present invention.

2 Heavy duty bumper adapted for housing the winch system.
6 A cavity shaped for housing a vertical-axis pulley.
8 A cavity shaped for housing a winch drum.
10 The bumper/winch system of the present invention.
12 A vertical-axis pulley.
13 Cable guard.
14 A vertical-axis pulley.
15 Cable guard.
16 Winch drum.
18 Winch drum axle.
20 Housing for horizontal-axis swivel-sheave 25.
22 A cavity shaped for housing horizontal-axis swivel-sheave 20.
24 Hook.
25 Horizontal-axis swivel-sheave
26 Cable.
30 Winch.
32 Hinge.
35 Cover.
40 Hydraulically powered stabilizing retractable system.
42 Stabilizing legs.
44 Stabilizing foot pad.
46 Retractable hinge.
50 Swivel connecting each leg to underside of bumper.
60 Rubber padding.
70 D-ring.
100 Prior art winch.
102 Prior art cable roller guides.

DEFINITIONS

Pulley, as used herein, refers to a mechanism composed of a wheel (also called a sheave) with a groove between two flanges around the wheel's circumference. A rope, cable, belt, or chain usually runs inside the groove. Pulleys are used to change the direction of an applied force, that is, they act as cable directing devices, transmit rotational motion, or realize a mechanical advantage in either a linear or rotational system of motion.

It should be understood that the drawings are not necessarily to scale. In certain instances, details which are not necessary for an understanding of the present invention or which render other details difficult to perceive may have been omitted.

DETAILED DESCRIPTION

Referring now, with more particularity, to the drawings, it should be noted that the disclosed invention is disposed to embodiments in various sizes, shapes, and forms. For example, the bumper, as taught herein, is contemplated to be sized and shaped with respect to the vehicle or other machine with which it will be used. Similarly, the bumper, its cover, and the pad are contemplated to be made from any materials possessing the required properties. Moreover, the recovery apparatus may not be a vehicle, it is contemplated to be other types of machines. Additionally, the machine using these invention principles could be a machine that places objects instead of retrieving objects. The means of powering the machine can be any known power means from manual to electric, hydraulic, gas, solar, battery, etc. Therefore, the embodiments described herein are provided with the understanding that the present disclosure is intended as illustrative and is not intended to limit the invention to the embodiments described herein.

The present invention is directed towards a winch system, that may be remotely power-driven, that minimizes, or eliminates, uneven feed of the winch cable onto the winch drum thus preventing tangling of the cable requiring only a minimal number of parts. The principles of the invention do not require that the invention be power-driven, but it is obviously preferable. The winch, vertical-axis pulleys, and horizontal-axis swivel sheave are housed within the protection of a cavities built into a custom-built, heavy-duty bumper. The vertical-axis pulleys and winch are positioned within covered cavities set into the upward facing surface of the bumper. The winch cavity is at one end of the length of the bumper and the cavity holding the one vertical-axis pulley to which the cable is first directed is on the opposing end of the bumper which, in part, provides for the winch cable to be as long as possible. The length of the cable as measured from the winch to the pulley that is on the end of the bumper opposing the winch and from there to the swivel sheave should be as long as possible. This length should aim to be about one and a half times as long as the axial length of the bumper. Locating the winch relative to the pulleys and the vehicle to be recovered provides, in part, for the cable to be always maintained perpendicular to the rotational axis of the drum as it is fed to the drum. In this example, the winch is positioned on the bumper angled relative to the long axis of the bumper to assure that the winch cable is always maintained perpendicular to the rotational axis of the drum. The cavity holding the second vertical-axis pulley to which the cable is directed is located in the center of the bumper just behind the swivel-sheave to guide the cable from the first vertical-axis pulley to the swivel sheave. The swivel-sheave through which the cable passes as it is leaving or entering the area of the bumper is positioned within a cavity open to both the top surface and the front facing surface of the bumper. Together, the innovative spaced positioning of the winch and pulleys relative to one another and to the vehicle to be recovered, which is made possible by the swivel sheave, provides for the winch to recover an object regardless of how the object is positioned with reference to the recovery vehicle. Additionally, there are retractable, swivel-able recovery legs that level and stabilize the recovery vehicle over uneven ground surface conditions. In this example the legs are power-driven, but do not have to be.

Figure 3:
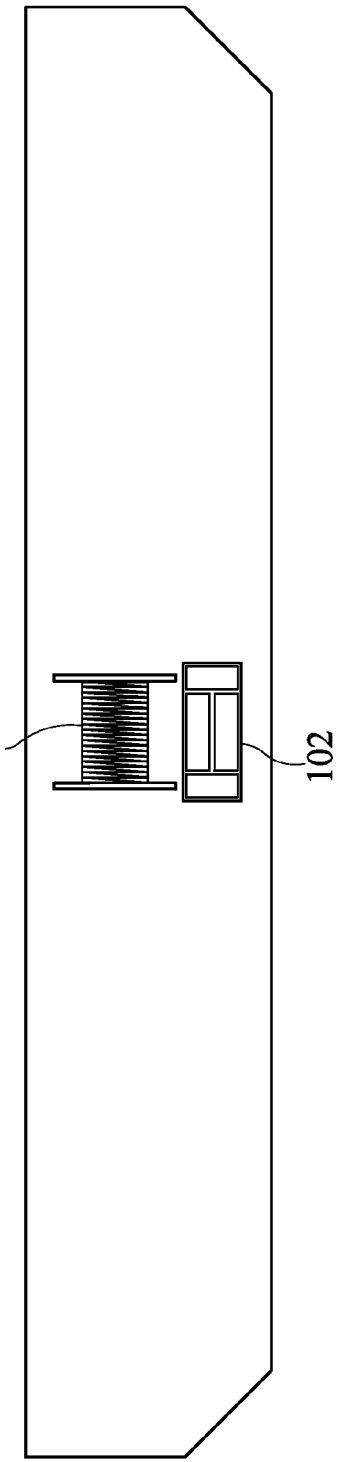
FIG. 3 is a plan view illustrating the prior art.

Turning now to the drawings, FIG. 3 illustrates a winch system of presently available recovery vehicles. Winch 100 is attached to the surface of a recovery bumper midway from each end of the bumper. In front of the winch is a cable roller guide to guide the cable from and to the winch. As discussed above, the only time a winch cable of a currently available recovery vehicle can be maintained in a position that is perpendicular to the axis of the winch drum is when the object to be recovered in directly in front of the vehicle's winch system. This situation does not occur frequently. It was from working with this type of winch device that the present inventor realized that the only way to prevent the tangling that occurs frequently and regularly using this winch system is to provide a system that maintains the winch cable positioned perpendicularly to the winch drum.

According, the inventor formulated a set of principles that enables the winch cable to be maintained perpendicular to the winch drum while the cable is being released from or played onto the drum, thus minimizing, or eliminating, uneven feed of the winch cable onto the winch drum thus preventing tangling and jamming of the cable. FIG. 1, a plan view of one favored embodiment, illustrates bumper/winch/stabilizing system 10 made according to the principles of the present invention. The system is contemplated for use on any machine that is used for lifting, pulling, or depositing. For exemplary purposes, which are not to be taken as limiting, the embodiment discussed below is focused on how the invention's principles are used on a tow truck, which includes, but is not limited to, wrecker trucks, breakdown trucks, recovery trucks, or lorries that are usually used to recover vehicles of any sort. Heavy duty, bumper 2, made from steel, aluminum, or any other material that offers the required strength and endurance, is exclusively designed for housing a winch system according to the principles of the present invention. Looking now at the upwardly-facing surface of bumper 2 are two cavities 6 and one cavity 8 set into the bumper and opening on the upwardly facing surface. In this example, the winch system further includes a remotely, hydraulic-power system, which is not shown because such system and their analogs are well known in the art. The winch system also includes winch 30 housed in cavity 8. Winch 30 is constructed of winch drum 16 (also referred to as a spool) that rotates about winch drum axle 18 to alternately play-out and wind-up cable 26. The winch system further includes two vertical-axis grooved pulleys 12 and 14, also referred to as sheaves or blocks, housed in cavities 6. Note that cavity 8 is oriented at an angle with respect to the long axis of the bumper so that the winch drum 16 is always positioned perpendicularly to cable 26. Note also, that cavity 8 is positioned on one end of the length of bumper 2 and that the cavity 6 that houses pulley 12 is located generally opposite to cavity 8 at the other end of bumper 2. Cavity 6 that houses pulley 14 is located midway between the two ends of bumper 2 just behind cavity 22. Set into the frontwardly-facing surface of bumper 2 and also opening to the upwardly-facing bumper surface cavity 22 houses horizontal-axis swivel-sheave 20 housed in housing 25. Positioning the three pulleys and the winch in this manner relative to each other and to the vehicle to be recovered provides for cable 26 always being positioned perpendicularly, or nearly so, to winch drum 16 and for the length of cable 26 to be the length required for maximum control of cable 26. Cable 26, with hook 24 attached to its free end, has its other end attached to winch drum 16. Preventing cable 26 from coming off of either vertical-axis grooved pulley 12 or 14, guides 13 and 15 are positioned about the pulleys, respectively. From winch drum 16, cable 26 extends across the axial length of bumper 2 to pulley 12, further extending to pulley 14, and then to swivel-sheave 25 from which cable 26 with hook 24 attached hangs free for use. In the embodiment illustrated, the winch system is powered by hydraulics, but could just as well be powered using mechanical, electric, pneumatic, or internal combustion drives. The type of power chosen does not change the principles of the invention and all such power sources, including solar and others not so identified, but suitable, are contemplated for use with the invention. Moreover, the principles for the present invention provide for a winch/stabilizer system that can be remotely powered from inside of the cab of a tow truck, as in this example.

When a vehicle requires recovering, the recovery vehicle fitted with a remotely controlled, hydraulically-powered winch system following the principles of the present invention is positioned with respect to the vehicle being recovered and the remotely controlled, hydraulically-powered retractable recovery stabilizing system 40 (see below for more discussion of system 40) is put into place to level and stabilize the recovery vehicle. This step increases operator safety and protects against unwanted motion of the recovery vehicle. Even if the recovery vehicle can not be oriented in all possible positions with respect to the vehicle to be recovered, swivel sheave pulley 25 can be swivel so that the vehicles are effectively oriented with respect to each other. In order to attach the recovery winch cable to the object being recovered, cable 26 is played out from the winch drum so that it first is wound around pulley 12 and then about pulley 14. The pulleys change the direction of the applied force, transmit rotational motions, and/or realize a mechanical advantage in either or both linear and rotational motion to provide for an even winding of the cable on the drum. The use of more than one pulley provides for maximum redirection of the pulling force to enhance even-winding of the cable on the drum. Moreover, the positioning of the pulleys and the winch relative to one another provides the cable length required for maximum control of cable movement and orientation. Cable 26 is then oriented about horizontal-axis, grooved, swivel-able sheave 24 providing direction-changing freedom of motion to the sheave. Thus, the swivel-able connection provides for the recovery vehicle to use the winch to recover an object regardless of the position of that object in relation to the recovery vehicle. This means that the previously required positioning and repositioning of the recovery vehicle in order to maintain the object to be recovered in perfect perpendicular alignment with the recovery bumper is no longer required. Protecting the bumper from damage when it is used to push an object being recovered is rubber padding 60 permanently attached to the bumper. To provide access to the winch hook and cable, the rubber padding is provided with an opening over the cavity that is housing the cable hook, cable end, and sheave. Optional cover plate 35, which is this example is hingedly attached to bumper 2 using hinges 32 for easy and rapid positioning of cover 35 over the top surface of the heavy-duty bumper to protect the pulley system parts housed in the cavities that open to the top of the bumper from effects of the elements. In the illustrated invention, such a cover is contemplated to be manufactured of steel or aluminum, but any material that will provide a durable cover is contemplated to be used with the invention. The hinged attachment of the cover to the bumpers provides for easy lifting of the cover when the relevant parts of the winch system need to be accessed. In another version, there is a snap-on cover which is easily removed in order to access the pulley system. It is clear then that the invention may be used with or without a cover and that any style and/or material used to make the cover is considered for use with the invention.

Figure 2:
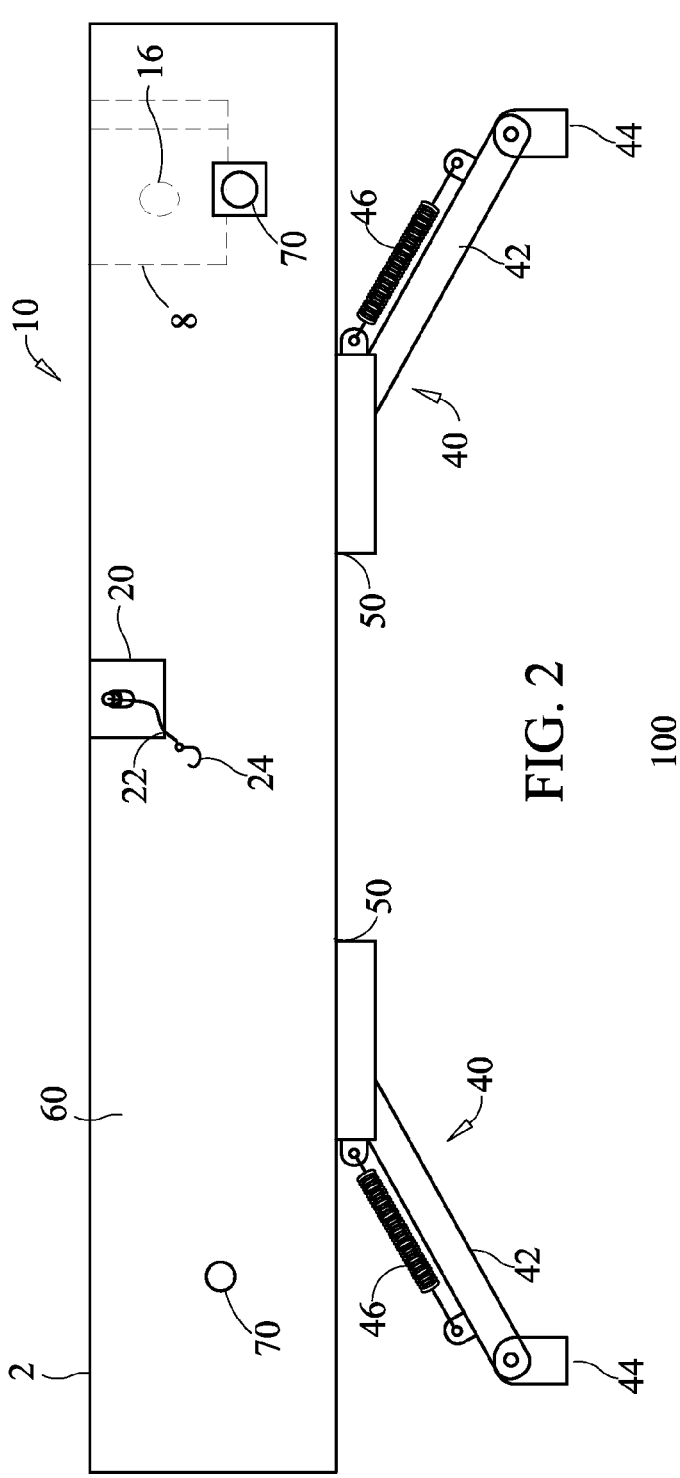
FIG. 2 is an elevation view of the bumper housing a winch-cable system, as shown in FIG. 1, and power-driven retractable stabilizing recovery legs.

Another part of the bumper/winch system of this example, is hydraulically-powered retractable recovery stabilizing system 40 as illustrated in the front elevation view of FIG. 2. It is to be understood that the retractable recovery stabilizing system 40 may be powered by any form of power, including but not limited to manual, electric, solar, and battery. As illustrated, stabilizing system 40 has at least two elongated stabilizer support legs 42 with one end of each support leg connected to the bottom of the bumper by swivel connector 50 and the opposing end of each support leg 42 being provided with foot-pad 44 for secure, non-skid placement on the ground surface. In the vicinity of the midpoint of each leg 42 is attached a piston-controlled hinge 46 that is also attached to the bottom of the bumper to provide for remote control raising and lowering of the support legs. Also optional, are D-rings positioned in cavities recessed into the outwardly facing surface of the bumper to provide for extra line connection, if desired.

To use the system, the hook and cable of the bumper/winch system is accessed and played out through the opening that provides for such access in the rubber protective padding on the front outwardly facing bumper surface. Cable 26 is played out until the cable hook is securely anchored to the object to be recovered. Optional, steel or aluminum top bumper cover could also be raised at this time to its open position, if it is of hinged design, to view the working of the system. Using the recovery vehicle's power system, the winch is then tensioned in the usual manner to move the object to be recovered. Tensioning the cable requires rewinding the cable on the drum until the desired tension is realized. The pulley system design following the principles of the present invention maintains the required length of the winch cable in a perpendicular orientation with respect to the winch drum providing for smooth rewinding of the cable onto the winch eliminating the need to stop, out-wind and rewind multiple times in order to untangle a tangled cable in order to recover an object to be recovered. This advantage, in turn, prevents damage to the cable and, thus increases the life span of the cable. In the event the object to be recovered is situated so that the recovery vehicle cable cannot be fed to the cable drum so that it is perpendicular to the rotational axis of the drum, the cable will likely become jammed and possibly damaged. Once jammed, the cable must be manually unjammed and manually guided onto the drum. This process likely will need to be repeated several times before the cable is completely wound on the drum. Using the principles of the present invention, the presence of the vertical-axis, direction-changing sheave 24 provides for the recovery vehicle to use the winch to recover an object regardless of the position of that object in relation to the recovery vehicle, Winch 30 is actuated by the recovery vehicle's hydraulic motor (not shown) to wind the cable onto the drum, in the system illustrated. The motor controlling the winch motion is, in the system illustrated, remotely operable in a suitably controlled, truck-battery-energized circuit (not shown but which is essentially conventional).

The foregoing description, for purposes of explanation, uses specific and defined nomenclature to provide a thorough understanding of the invention. However, it will be apparent to one skilled in the art that the specific details are not required in order to practice the invention. Thus, the foregoing description of the specific embodiment is presented for purposes of illustration and description and is not intended to be exhaustive or to limit the invention to the precise form disclosed. Those skilled in the art will recognize that many changes may be made to the features, embodiments, and methods of making the embodiments of the invention described herein without departing from the spirit and scope of the invention. For example, the bumper may be used on the front, the rear, or both ends of a recovery vehicle. The bumper may be made of any material into which the above described cavities may be formed, as long as the material provides the durability required by a recovery vehicle. The "rubber" padding may be of any other padding material. There may be or may not be a protective, removable cover over the top surface of the bumper and over the opening provided in the rubber padding, as described. Furthermore, the present invention is not limited to the described methods, embodiments, features or combinations of features but include all the variation, methods, modifications, and combinations of features within the scope of the appended claims. The invention is limited only by the claims.

What is claimed is:

1. An apparatus, comprising:
   a winch system, comprising
   a first pulley attached to a first end of a support;
   a winch attached to a second end of said support, and
   a second pulley attached to said support between said first pulley and said winch and adjacent a swivel sheave,
   a cable having one end attached to said winch, said cable directed by said first and second pulleys and said swivel sheave to be wound or unwound about said winch to which said cable is attached,
   said pulleys, said swivel sheave, and said winch operatively arranged with respect to each other so as to maintain said cable perpendicular, or nearly so, to the rotational axis of a winch drum as it is fed to or played off of the drum so as to prevent the cable from jamming as said cable is used to either recover or deposit an object.

2. The apparatus, as recited in claim 1, wherein said winch is oriented with respect to a long axis of said support so that said cable is maintained positioned perpendicularly, or nearly so, to the axis of rotation of said winch so as to prevent the cable from jamming as said cable is used to either recover or deposit an object.

3. The apparatus, as recited in claim 2, wherein said cable attached to said winch is directed by said first pulley, then by said second pulley, and then by said swivel sheave.

4. The apparatus, as recited in claim 2, wherein said winch is located relative to said first and second pulley and said swivel sheave and a vehicle to be recovered so that said cable running between said winch and said swivel sheave is of a maximized length.

5. The apparatus, as recited in claim 4, wherein said support is a bumper.

6. The apparatus, as recited in claim 5, wherein said maximized length aims to be about one and a half times as long as the axial length of said bumper.

7. The apparatus, as recited in claim 5 wherein said winch further comprises a winch drum having it axis of rotation at an angle from the long axis of the bumper.

8. The apparatus, as recited in claim 7 wherein said winch is oriented with respect to a long axis of said bumper so that said cable is always positioned perpendicularly to the rotational axis of said winch drum.

9. The apparatus, as recited in claim 5 wherein said swivel sheave is housed in a cavity in said bumper open on an upwardly-facing surface and an outwardly-facing side surface of said bumper.

10. The apparatus, as recited in claim 5, wherein said winch positioned at the second end of the length of said bumper has a horizontal axis of rotation and said first pulley having a vertical axis of rotation is located generally opposite to said winch at a first end of said bumper.

11. The apparatus, as recited in claim 10, wherein said swivel sheave is located approximately midway between said first and second ends of said bumper.

12. The apparatus, as recited in claim 10, wherein said second pulley is located just behind said swivel sheave.

13. The apparatus, as recited in claim 2, wherein said first and said second pulley are fitted with a cable guard so as to maintain said cable on said pulley.

14. The apparatus, as recited in claim 1, wherein said winch system is controlled remotely.

15. The apparatus, as recited in claim 14 wherein said first pulley, said second pulley, said swivel sheave, and said winch are housed in cavities open on an upwardly-facing surface of said bumper.

16. The apparatus, as recited in claim 1 wherein said set of pulleys and said winch comprise a winch system where the rotating axis of the pulleys are perpendicular to the rotating axis of the winch.

17. The apparatus, as recited in claim 16, wherein said winch system further includes a power system for powering said winch.

18. The apparatus, as recited in claim 16, wherein said winch system further comprises a set of stabilizing legs each leg attached to said bumper so as to stabilize and secure the recovery or release apparatus.

19. An apparatus, comprising:
a winch having a winch drum;
at least two vertical axis cable directing devices,
at least one horizontal-axis swivel sheave,
said winch, said at least one swivel sheave, and said at least two vertical axis cable directing devices operatively arranged on and attached to a support with said winch on one end of said support, one of said at least two vertical axis cable directing devices at an opposing end of said support and another one of said at least two vertical axis cable directing devices and said swivel sheave located there between so as to maintain a winch cable perpendicular, or nearly so, to the rotational axis of the winch drum as said cable is fed to or played off of the drum to which it is attached regardless of the relative positions of the winch and an object to be recovered or deposited.

20. A winch apparatus, comprising:
a vehicle recovery or deposit winch stabilizing apparatus, including:
a winch secured on one end of a bumper to be secured in spaced relation to a frame of a recovery vehicle;
a cable attached to said winch;
a cable directing first pulley secured on an opposing end of the bumper,
a cable directing second pulley secured on the bumper approximately midway between said first pulley and said winch, and
a cable directing swivel sheave secured to the bumper proximate to said second pulley so as maintain said cable directed by said first pulley, said second pulley, and said swivel sheave positioned perpendicular, or nearly so, to the rotational axis of a winch drum as it is fed to or played off of the drum so as to prevent said cable from jamming as said cable is used to either recover or deposit a vehicle.

* * * * *